(12) United States Patent
Irons

(10) Patent No.: US 7,464,099 B2
(45) Date of Patent: Dec. 9, 2008

(54) METHOD AND SYSTEM FOR TRANSFERRING CONTENT FROM A DATABASE TO A FILE

(75) Inventor: Jonathon Peter Irons, St. Lucia (AU)

(73) Assignee: Tralee Software Pty, Ltd., Kiliara (AU)

( * ) Notice: Subject to any disclaimer, the term of this patent is extended or adjusted under 35 U.S.C. 154(b) by 252 days.

(21) Appl. No.: 10/484,030

(22) PCT Filed: Jul. 18, 2002
(Under 37 CFR 1.47)

(86) PCT No.: PCT/AU02/00959

§ 371 (c)(1),
(2), (4) Date: Oct. 6, 2004

(87) PCT Pub. No.: WO03/009170

PCT Pub. Date: Jan. 30, 2003

(65) Prior Publication Data

US 2006/0053141 A1    Mar. 9, 2006

(30) Foreign Application Priority Data

Jul. 18, 2001    (AU) .................................... PR6457

(51) Int. Cl.
   *G06F 7/00*    (2006.01)
   *G06F 12/00*    (2006.01)
(52) U.S. Cl. .......................... 707/101; 707/205
(58) Field of Classification Search ............... 707/1, 707/3, 100, 102
See application file for complete search history.

(56) References Cited

U.S. PATENT DOCUMENTS

| 5,842,211 | A  | * | 11/1998 | Horadan et al. ............... 707/10 |
| 5,842,213 | A  | * | 11/1998 | Odom et al. ................. 707/100 |
| 2002/0010700 | A1 |   | 1/2002 | Wotring et al. .............. 707/100 |
| 2002/0091702 | A1 | * | 7/2002 | Mullins ..................... 707/100 |
| 2002/0099687 | A1 |   | 7/2002 | Krishnaprasad et al. ......... 707/1 |
| 2002/0099715 | A1 |   | 7/2002 | Jahnke et al. ............... 707/100 |

(Continued)

FOREIGN PATENT DOCUMENTS

AU        740007        8/1998

(Continued)

OTHER PUBLICATIONS

Dietrich et al., Proceedings of the 32nd ACM SIGSE Technical Symposium on Computer Science Education, pp. 362-366, Feb. 2001.*

(Continued)

*Primary Examiner*—Cheyne D Ly
(74) *Attorney, Agent, or Firm*—Steptoe & Johnson LLP

(57) ABSTRACT

The present invention provides a method of transferring content from a file and a database. In this case, the file includes content instances, each content instance being associated with a respective field, and each field having a respective type. The transfer is achieved by determining the type of each field, and then storing each content instance in a store in accordance with the determined field type of the associated field. Each content instance can then be transferred to the database in accordance with the determined field type. A similar procedure is provided for creating XML files based on content within the database.

11 Claims, 14 Drawing Sheets

U.S. PATENT DOCUMENTS

| | | | |
|---|---|---|---|
| 2002/0112224 A1 | 8/2002 | Cox | 717/100 |
| 2002/0124005 A1* | 9/2002 | Matson et al. | 707/101 |
| 2003/0018978 A1* | 1/2003 | Singal et al. | 725/115 |

FOREIGN PATENT DOCUMENTS

| | | |
|---|---|---|
| EP | 1 089 195 | 4/2001 |
| WO | WO01/33433 | 5/2001 |
| WO | WO01/42881 | 6/2001 |
| WO | WO01/61566 | 8/2001 |

OTHER PUBLICATIONS

Roantree et al., SIGMOD Record, vol. 28, No. 1, pp. 97-103, 1999.*
Juul et al., Proceedings of the 34th Hawaii International Conference on System Sciences, pp. 1-10, Jan. 2001.*

* cited by examiner

METHOD AND SYSTEM FOR TRANSFERRING CONTENT FROM A DATABASE TO A FILE

BACKGROUND OF THE INVENTION

The present invention relates to a method and a processing system for transferring content between a file and a database.

DESCRIPTION OF THE PRIOR ART

The reference to any prior art in this specification is not, and should not be taken as, an acknowledgement or any form of suggestion that the prior art forms part of the common general knowledge in Australia.

The need for Enterprise Application Integration (EAI) that emerged in the 1980s is likely to grow strongly as the Internet becomes truly pervasive and automated information flow between disparate applications becomes an expectation. The EAI challenge is complex and two-fold. Firstly, a system is required to ensure that information available on one computer can automatically be made available on another computer without human intervention such as re-entering or e-mailing. Secondly, if the data formats are different, translation is necessary.

One common approach is Object Distribution where technologies such as CORBA or RMI are used to make a shared Business Object Model available on separate application instances. The Object Distribution technique typically results in close coupling between the integrated application instances. This implies low latency in information update, but an increased dependence between the applications Another approach is Message Passing where messages containing application data are sent between application instances. The Message Passing technique results in loose coupling between the integrated instances with an increased latency in information update but improved application independence. The loose coupling places a burden on the Message Passing infrastructure to ensure messages are delivered.

The task of business integration typically involves two application installations, each of which will generally have some form of data store. The communication between them will use an application specific program at each end and Message Transport. These programs have two purposes, to insert data from the source database into a message that the Message Transport can deliver; and to insert the data from a received message into the target database.

Application integration using messaging requires a translation between the application data format and the message format. The complexity of this translation depends on the similarity between the data format and the message format.

Given a defined Message Format and a defined Target Structure, a custom solution can generally be developed to translate and map between the Message Format and the Target Structure. However, this may only be useable in a particular application. Its development requires the use of skilled resources (in some cases highly skilled where the structures are complex). As a result the development cost is assigned to the single installation, and ongoing software maintenance may be required to cater for Message Format changes and Target Structure changes.

This form of architecture is useful in a number of scenarios.

A first scenario is Business to Business integration where independent businesses or sites require data integrity between logically or physically different sites. For instance, a wholesaler may have need of regular interchange of business information with a number of retailers. In this case the wholesaler will automatically distribute catalogue and pricing information from the wholesaler's financial system to the retailer's financial system. The retailer's financial system will send orders for stock directly to the wholesaler's financial system. The wholesaler's inventory management system will notify the retailer's financial system of order dispatch. The retailer's inventory management system will notify the wholesaler's financial system of receipt of goods, and the wholesaler's financial system will send an invoice to the retailer's financial system.

Another scenario is multi-tiered application integration with different applications fulfilling a variety of functions in an organisation. For instance, a business has a web-application capable of taking orders, a warehouse management system and a financial system. The web application will send a request for stock availability to the warehouse management system. The warehouse management system will report on stock availability to the web application. The web application will send confirmation of payment details to the financial system. The web application will send order details to the warehouse management system. The financial system will send approval to ship to the warehouse management system.

SUMMARY OF THE PRESENT INVENTION

In a first broad form the present invention provides a method of transferring content from a file to a database, the file including content instances, each content instance being associated with a respective field, and each field having a respective type, the method including:

a) Determining the type of each field;

b) Storing each content instance in a store in accordance with the field type of the associated field; and, c) Transferring each content instance to the database in accordance with the determined field type.

Typically the file is an XML file, with each content instance being a respective node in the XML file. However, the techniques can also be applied to other files, and in particular, files having a hierarchical structure.

Typically, when the file is an XML file, the method includes determining the field type from a document definition file. However, the field type may be determined in other manners as appropriate to the type of file.

The database is typically a relational database having a number of database fields, each having a respective type. In this case, the method usually includes transferring each content instance into a respective database field in accordance with the database field type.

Typically the method includes storing each content instance in database using a respective query, the query being generated in accordance with the field type and the database field type. In this case, the query is typically an SQL query.

The method of transferring each content instance to the database can include:

a) Creating one or more vacant locations in the query in accordance with the field type;

b) Transferring each content instance into a respective vacant location; and, c) Applying the query to the database to thereby transfer the content instance(s) to the database.

The method generally includes storing each content instance in a store by:

a) Determining a mapping between each field type of the associated field and each database field type;

b) Creating a store field corresponding to each content instance, each store field being determined in accordance with the field type of the associated field and the mapping; and, c) Transferring the content instance to the respective store field.

The method typically includes determining the mapping from a predetermined mapping stored in a store.

The method generally includes using a processing system, the processing system having a processor coupled to a store, the processor being adapted to:

a) Receive the file;
b) Determine the field type of each field;
c) Store each content instance in the store; and,
d) Transfer each content instance from the store to the database.

In a second broad form the present invention provides a processing system adapted to transfer content from a file to a database, the file including content instances, each content instance being associated with a respective field, and each field having a respective type, the processing system including a processor adapted to:

a) Determine the type of each field;
b) Store each content instance in a store in accordance with the field type of the associated field; and,
c) Transfer each content instance to the database in accordance with the determined field type.

In this case, the processing system generally includes a memory, with the processor being adapted to create the store in the memory.

The processing system is generally adapted to perform the method of the first broad form of the invention.

In a third broad form the present invention provides a computer program product for transferring content from a file to a database, the computer program product including computer executable code which when executed by a suitably programmed processing system causes the processing system to perform the method of the first broad form of the invention.

In a fourth broad form the present invention provides a method of transferring content from a database to a file, the database including content instances, each content instance being associated with a respective database field, and each database field having a respective type, the method including:

a) Retrieving each content instance from the database;
b) Storing each content instance in a store in accordance with the database field type of the associated database field;
c) Creating a file; and,
d) Transferring each content instance into the file, each field having a respective type determined in accordance with the associated database field type.

In this case, the file is typically an XML file, with the database being a relational database as described above.

Accordingly, the method typically includes:

a) Creating the query including one or more vacant locations;
b) Applying the query to the database to thereby transfer each content instance into a respective vacant location; and,
c) Transferring each content instance to the store.

The method generally includes:

a) Determining a mapping between each database field type of the associated database field and each field type;
b) Transferring each content instance into a respective store field, the type of the store field being determined in accordance with the database field type; and, c) Generating fields in the file in accordance with the database field type of each associated database field and the mapping; and, d) Transferring each content instance from the store field to the respective field.

The method generally includes determining the mapping from a predetermined mapping stored in a store.

The method generally includes using a processing system, the processing system having a processor coupled to a store, the processor being adapted to:

a) Retrieve each content instance from the database:
b) Store each content instance in the store; and,
c) Generate the file.

In a fifth broad form the present invention provides a processing system adapted to transfer content from a database to a file, the database including content instances, each content instance being associated with a respective database field, and each database field having a respective type, the processing system including a processor adapted to:

a) Retrieve each content instance from the database;
b) Store each content instance in a store in accordance with the database field type of the associated database field; and,
c) Generate a file, the file including each content instance associated with a respective field, and each field having a respective type determined in accordance with the associated database field type.

The processing system generally includes a memory, the processor being adapted to create the store in the memory.

The processing system is preferably adapted to perform the method of the fourth broad form of the invention.

In a sixth broad form the present invention provides a computer program product for transferring content from a file to a database, the computer program product including computer executable code which when executed by a suitably programmed processing system causes the processing system to perform the method of the fourth broad form of the invention.

BRIEF DESCRIPTION OF THE DRAWINGS

An example of the present invention will now be described with reference to the accompanying drawings, in which.

DETAILED DESCRIPTION OF PREFERRED EMBODIMENTS

Figure 1:
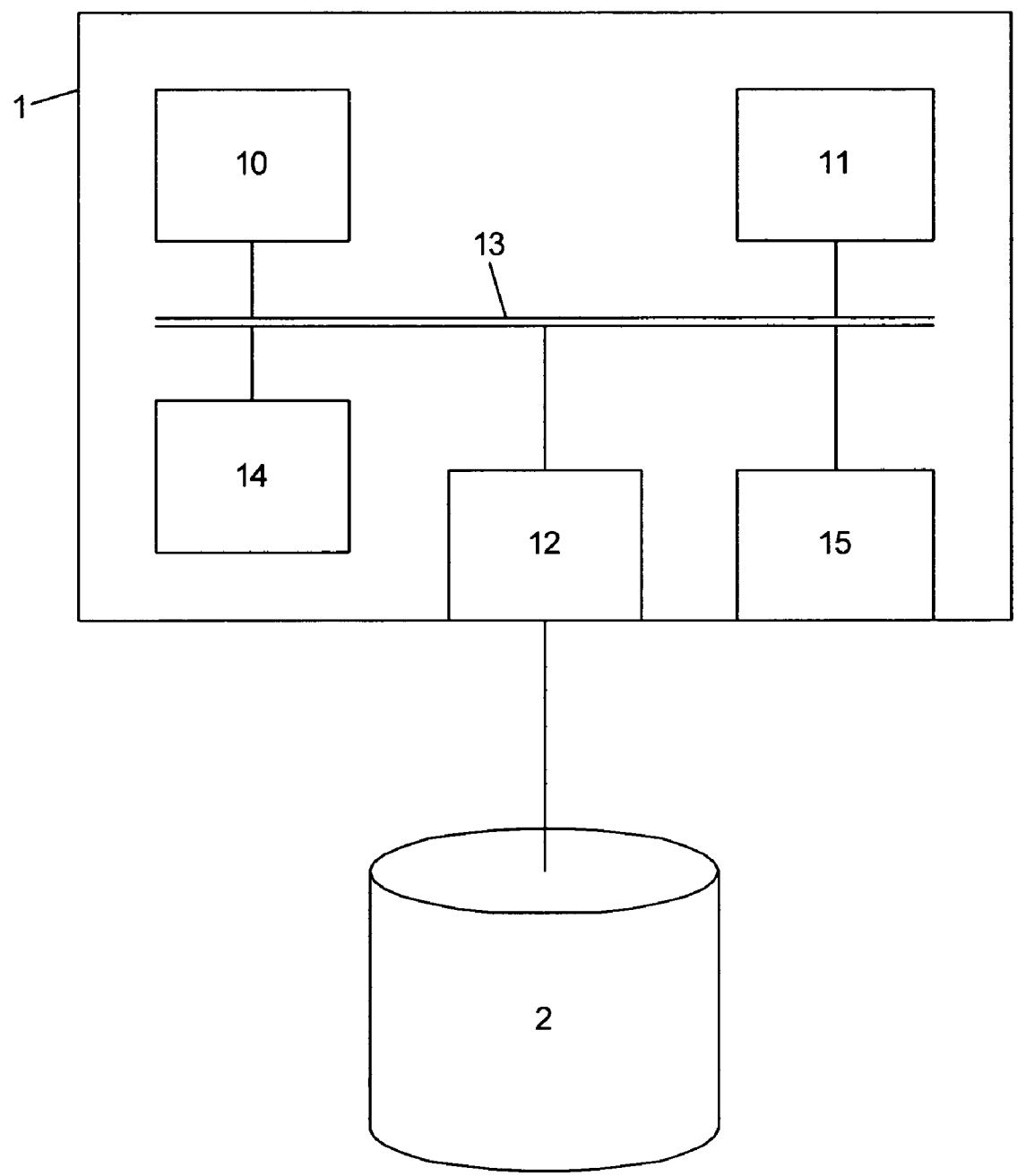
FIG. 1 is a schematic diagram of an example of a system for implementing the present invention.

An example of apparatus suitable for implementing the present invention is shown in FIG. 1.

As shown, the apparatus includes a processing system 1 coupled to a database 2. The processing system 1 is adapted to receive data files having any one of a number of predetermined formats. The processing system 1 then operates to extract content from the data file, storing the content in the database 2. Similarly, the processing system 1 is also adapted to extract content from the database 2 and then output the content in the form of a data file having a selected format.

In order to achieve this, the processing system 1 typically is formed from a processor 10, a memory 11 and an interface 12, coupled together via a bus 13, as shown. The processing system may also optionally include an I/O device 14, such as a keyboard and monitor, or the like, as well as a further external interface 15 for coupling the processing system 1 to external communication systems, as will be described in more detail below.

It will therefore be appreciated that the processing system 1 may be any form of processing system, such as a suitably programmed computer, such as a lap-top, palm-top or desk-top computer, specialized hardware processing systems, or the like. In any event, operation of the processing system 1 will be achieved by having the processor 10 execute appropriate application software as will be appreciated by those skilled in the art.

In use, the processing system 1 operates to extract content from the database 2 and generate an appropriate output file, or alternatively receive a file and extract the content from the file, storing the content in the database 2.

Overview

Figure 2:
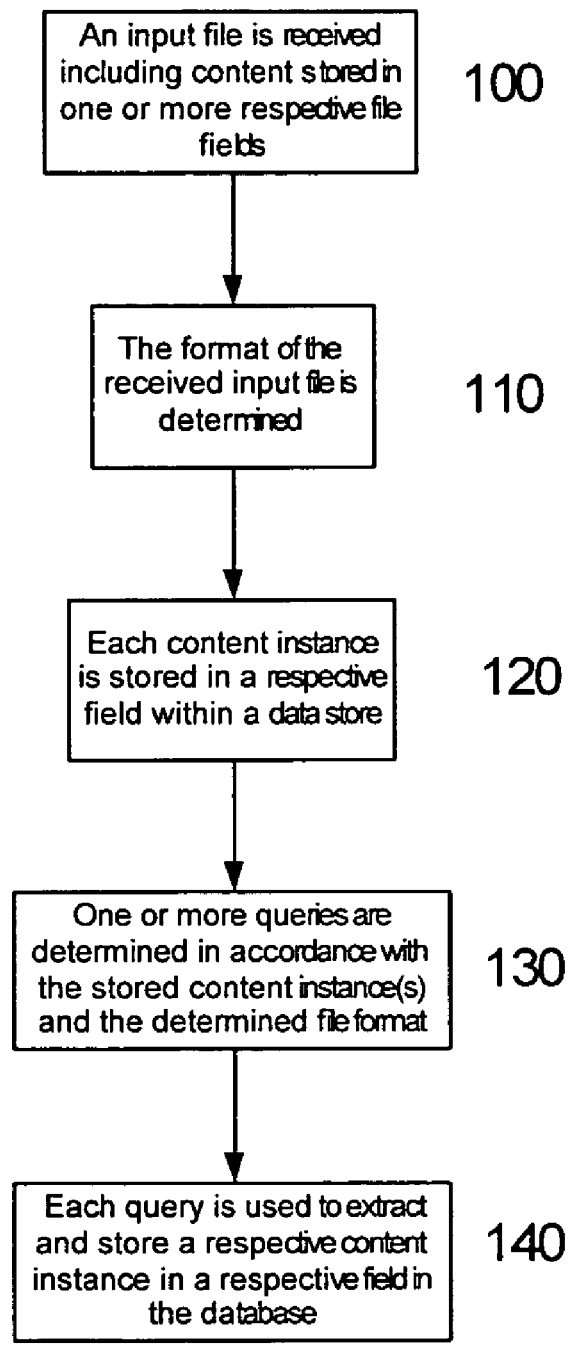
FIG. 2 is a flow chart outlining the process of transferring content from a file to the database.

The manner in which a file is received and the contents stored will now be described in outline with reference to FIG. 2.

As shown, a file including content stored in one or more respective file fields within the file is received at step 100 with the format of the received input file being determined at step 110.

Each content instance (each content instance being a respective piece of data or information within a respective file field) is then stored in a respective field within a data store at step 120.

At step 130 one or more queries are determined in accordance with the stored content instance(s) and the determined file format, before each query is used to extract a content instance from the data store and store the content instance in the database as required.

Once this is completed, it will be appreciated that all of the content instances stored in the file are stored within respective fields in the database 2.

An example of the way in which content may be output from the database in the form of an output file will now be described with reference to FIG. 3.

Figure 3:
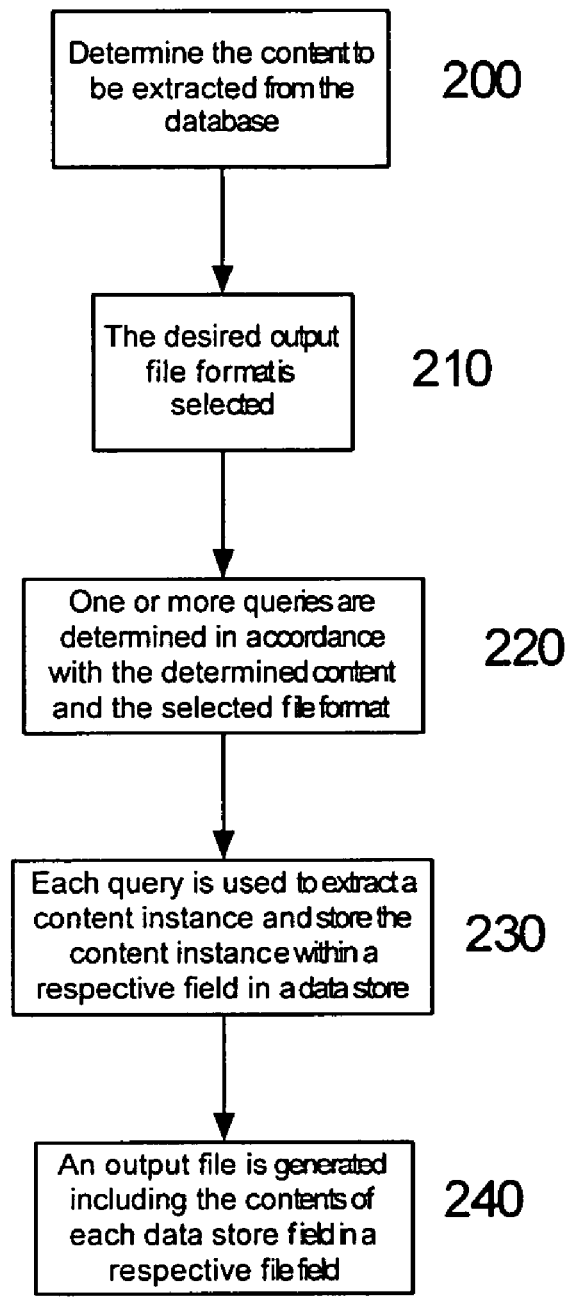
FIG. 3 is a flow chart outlining the process of transferring content from the database to a file.

As shown in FIG. 3, the process for retrieving content from the database 2 is to firstly determine the content to be extracted from the database at step 200. This may be achieved for example by responding to a query for information received from an external source, or the like.

Once the content has been determined, the desired format of the output file is selected at step 210. One or more queries are then determined at step 220, in accordance with the determined file format and the content.

Each query is then used to extract a respective content instance from the database 2, with each content instance being stored in a respective field within a data store.

Once all the required content instances have been stored in the data store, an output file is generated including each content instance stored within a respective file field.

The manner in input of content into and the retrieval of content from the database will vary depending to a large extent on the types of files involved and the nature of the database. Thus, whilst it will be appreciated that the techniques may apply to many different databases and file formats, the remainder of the description will focus on an example in which the files are XML files (eXtensible Markup Language), with the database 2 being a relational database.

However, these techniques may also apply to other forms of database such as any scripted language database, and other marked-up file types, such as HTML, SGML, or any hierarchical structure file format, or the like.

In any event, in the present example, as the database is a relational database, content is input into and extracted from the database using queries such as SQL (Structured Query Language) queries. However, other query forms may also be used as appropriate.

As will be appreciated by those skilled in the art, XML files by their nature can vary in the elements and attributes used therein. In order to ensure that the content of an XML file is correctly understood, all well-defined XML files are associated with a respective Document Type Definition, which defines the elements and attributes used within the file. Accordingly, the system uses a document definition or a combination of a document type definition and a mapping, to determine the type of content contained in each of the fields within the XML files. This allows the processing system to determine a mapping between fields in the XML file and the database, thereby allowing the content to be extracted from the XML file and stored in the database, or vice versa.

Detailed Description

The manner in which this is achieved will now be described in more detail.

Figure 4:
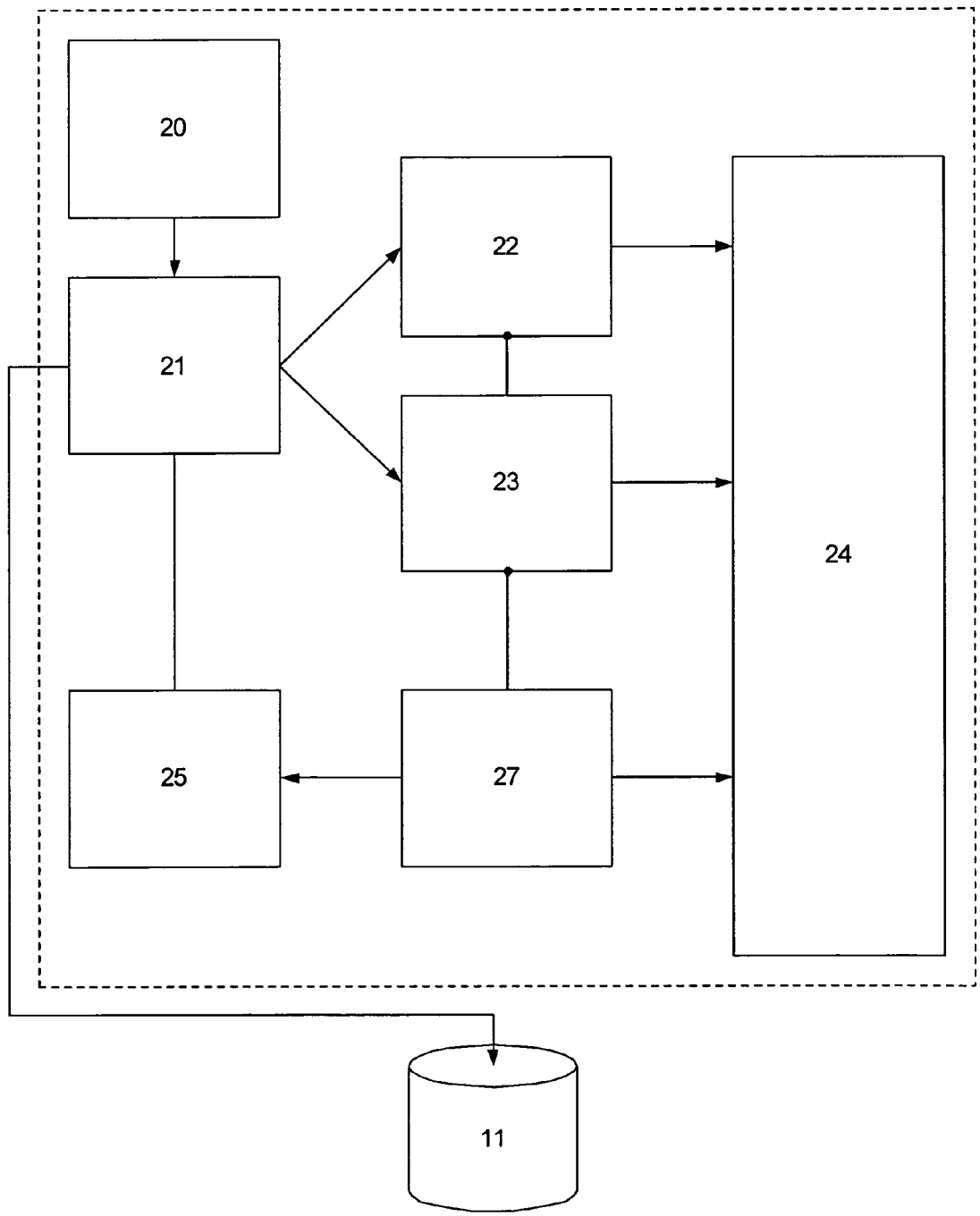
FIG. 4 is a schematic diagram of an example of the functionality of the processing system of FIG. 1 when transferring content from a file to the database.

In particular, an example of the functionality of the processing system 1 when importing data into the database 2 will now be described with reference to FIG. 4. As shown, the processing system includes an XML interface 20 coupled to an XMLInserter 21. The XMLInserter 21 is in turn coupled to a NodeMapFactory 22, a NodeMap 23, the database 2, and a data store 25, which is typically the memory 11. The NodeMap 23 is coupled to a NodeRules element 27, with each of the NodeMapFactory 22, the NodeMap 23, and the NodeRules element 27 being coupled to an Adapter Configuration 24 as shown.

It will be appreciated by those skilled in the art that this functionality is achieved by having the processor 10 execute appropriate applications software.

Figure 5A:
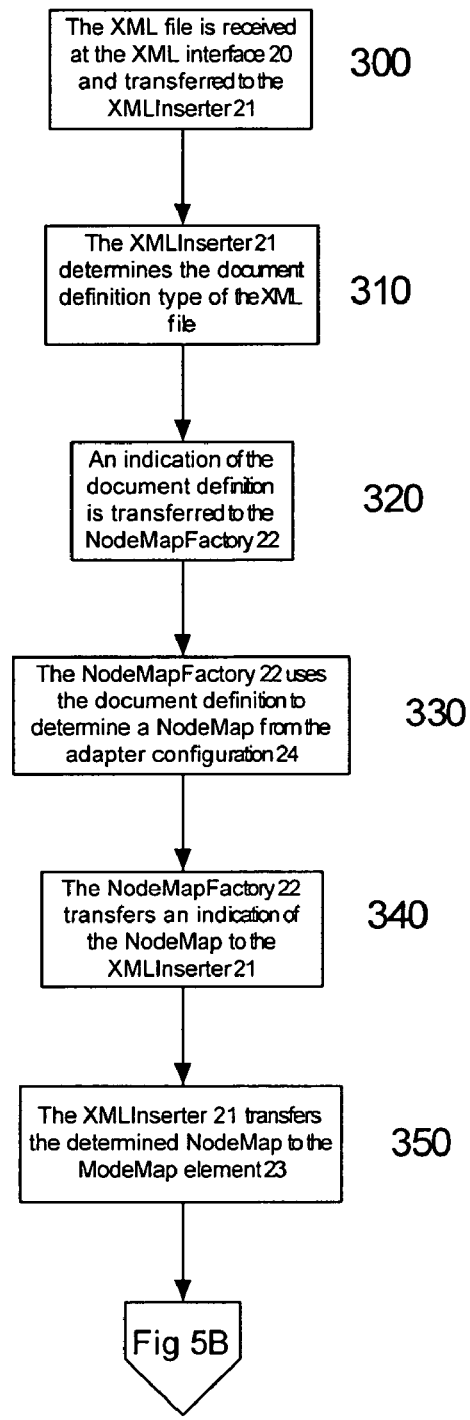
FIGS. 5A and 5B are a flow chart detailing an example of the process of transferring content from a file to a database.
Figure 5B:
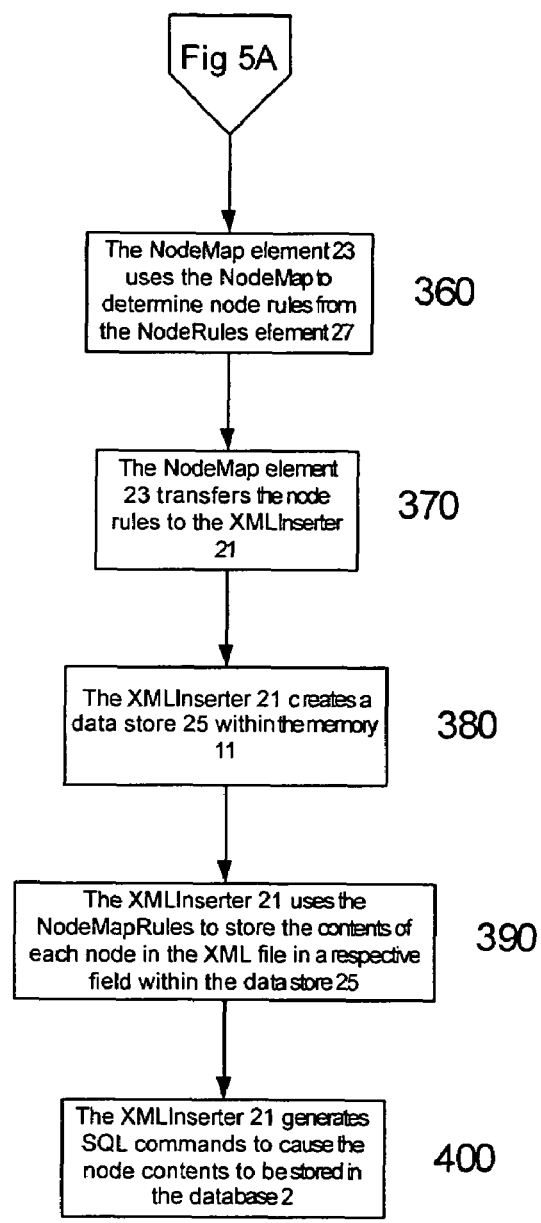

The operation of the system to import the content of an XML file will now be described in more detail with respect to FIG. 5.

Firstly, at step 300 the XML file is received at the XML interface 20 and transferred to the XMLInserter 21. It will be appreciated from this that the XML interface may therefore correspond to the interface 15 if the XML file is obtained from an external source or the like. Alternatively, the XML file may be received in other ways as will be appreciated by a person skilled in the art.

At step 310 the XMLInserter 21 determines the document type definition associated with the XML file. This may be achieved for example by examining the elements and attributes contained in the XML file and then comparing these to a list of elements and attributes contained within each different document definition. However, typically each XML file will include an indication of the document type definition associated with the respective file in the XML file itself.

Alternatively, the XMLInserter 21 may use other mechanisms for determining the XML structure such as an XML schema, or the like.

At step 320, an indication of the document type definition is transferred to the NodeMapFactory 22, which operates to determine a mapping in the form of a node map, from the Adapter Configuration 24 at step 330. Each node map indicates for a respective XML file type, the fields within the database 2 to which each node (element or attribute) type in the file should be mapped. Thus, this specifies the database fields (or tables) where the content of each type of element and attribute within the XML file should be stored within the database.

In general, when the system is initially configured, it is necessary to generate node maps for each type of XML file that is to be processed. In order to achieve this, the node maps may be either obtained from an external source, or generated manually if a required node map is not available. In order to generate a node map, an operative must examine an example XML file of the desired type, and then consider where the content of the file should be stored within the database 2.

After this, the operative defines the node rules specifying how the content of each node (each type of the element or attribute) should be stored in the database. Once node rules are defined for each type of node within the document type definition of the respective XML type, then the node rules are stored in the form of a node map within the Adapter Configuration 24.

It will be appreciated from this that the Adapter Configuration 24 typically includes a number of different node maps therein, with each node map corresponding to node rules for a different XML or other file type.

Accordingly, the NodeMapFactory 22 uses the document type definition to select the respective node map from the list of node maps stored in the Adapter Configuration. Once this has been completed, the NodeMapFactory 22 transfers an indication of the node map to the XMLInserter 21 at step 340. At step 350 the XMLInserter 21 transfers the determined node map to the NodeMap element 23.

At step 360 the NodeMap element 23 uses the node map to determine node rules from the NodeRules element 27. The node rules specify for each type of node contained within the XML file, the destination to which the node should be stored within the database. In any event, at step 370 the NodeMap element 23 transfers the node rules to the XMLInserter 21.

At step 380 the XMLInserter 21 creates the data store 25 within the memory 11. The data store 25 includes a respective field corresponding to each type of node within the XML file. Accordingly, this allows the XMLInserter 21 to use the node rules to map the content of each node (hereinafter referred to as a content instance) in the XML file into a respective field within the data store 25, at step 390. Thus, each content instance within the XML file is placed within a respective field in the data store 25.

In general, whilst each content instance is stored in a respective field, there may be occasions when multiple content instances are combined within a given field. This can occur for example when the database 2 is only to include a single field covering multiple nodes within the XML file. Thus for example, the XML file may include three nodes for specifying a date, with one node referring to the year, one to the month and one to the day. In this case, however, if the database includes only a single field referring generally to dates, then the field in the data store 25 may be formed by combining the content instances for each of the day, month and year nodes, thereby resulting in a single date content instance. It will be appreciated that content instances may also be split, say for example form a single date content instance into separate day, month and year content instances.

It will be realized that this technique may be applied to other forms of node, such as nodes containing name information or the like. Similarly the situation can be reversed, such that a single node in the XML file can be split into three content instances as the content is written into the data store 25.

In any event, at step 400 the XMLInserter 21 generates SQL commands that cause each content instance to be transferred from the respective field in the data store 25 into the database 12 as required.

Figure 6:
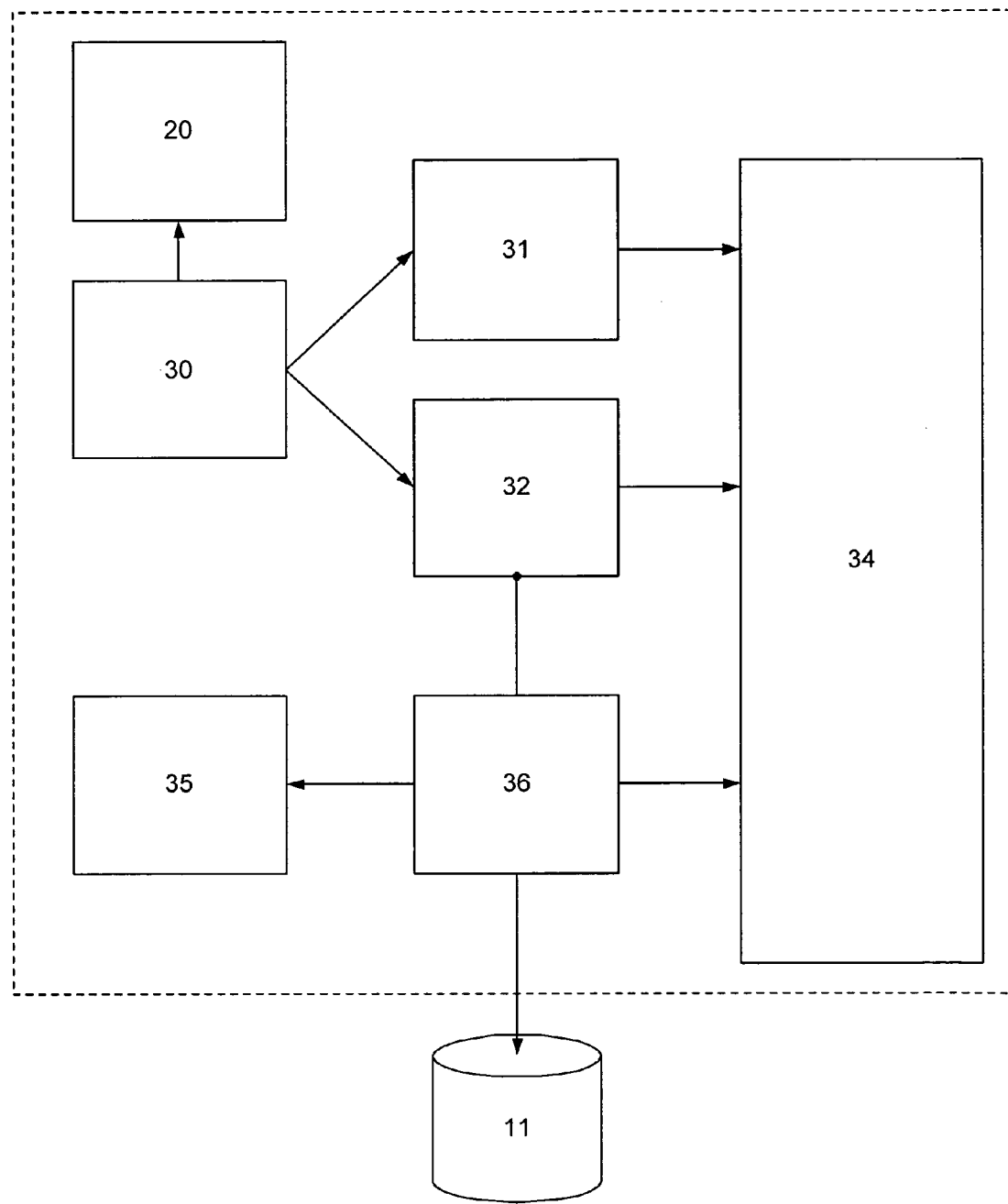
FIG. 6 is a schematic diagram of an example of the functionality of the processing system of FIG. 1 when transferring content from the database to a file.

An example of the functionality of the processing system 1 for exporting an XML file containing content from the database 2 will now be described with reference to FIG. 6.

As shown, the processing system 1 includes an XML interface 20 coupled to a XMLExtractor 30. The XMLExtractor 30 is in turn coupled to a XMLBuilderFactory 31 and an XMLBuilder 32. The XMLBuilder 32 is coupled to an XML-ReportNode 36 which is in turn coupled to the database 2 and a data store 35. The XMLBuilderFactory 31, the XMLBuilder 32 and the XMLReportNode 36 are also coupled to an Adapter Configuration 34, as shown.

Again, it will be appreciated by those skilled in the art that this functionality is achieved by having the processor 10 execute appropriate application software.

Figure 7A:
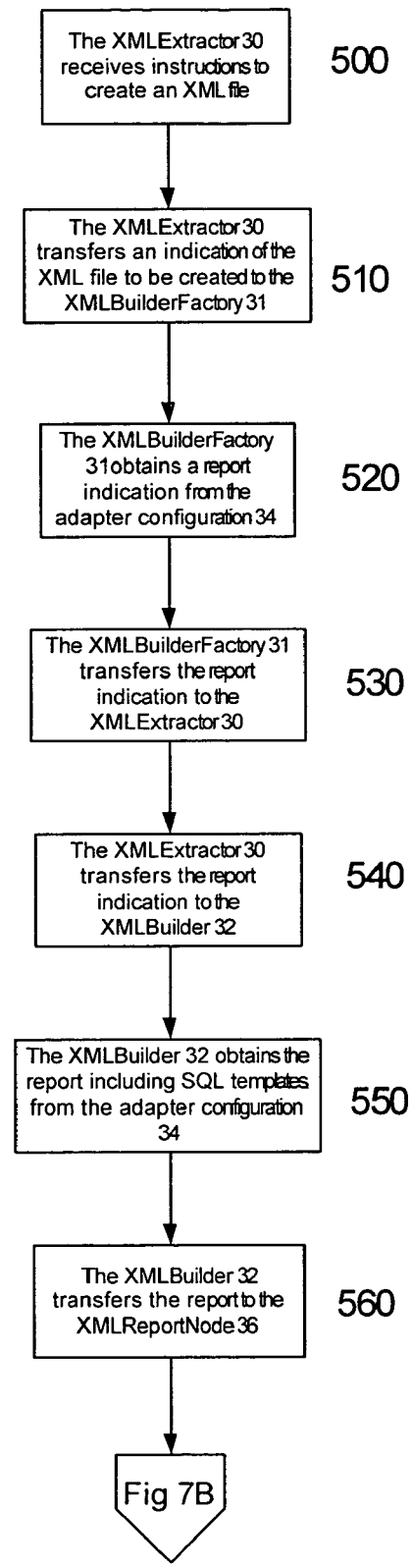
FIGS. 7A and 7B are a flow chart detailing an example of the process of transferring content from the database to a file.
Figure 7B:
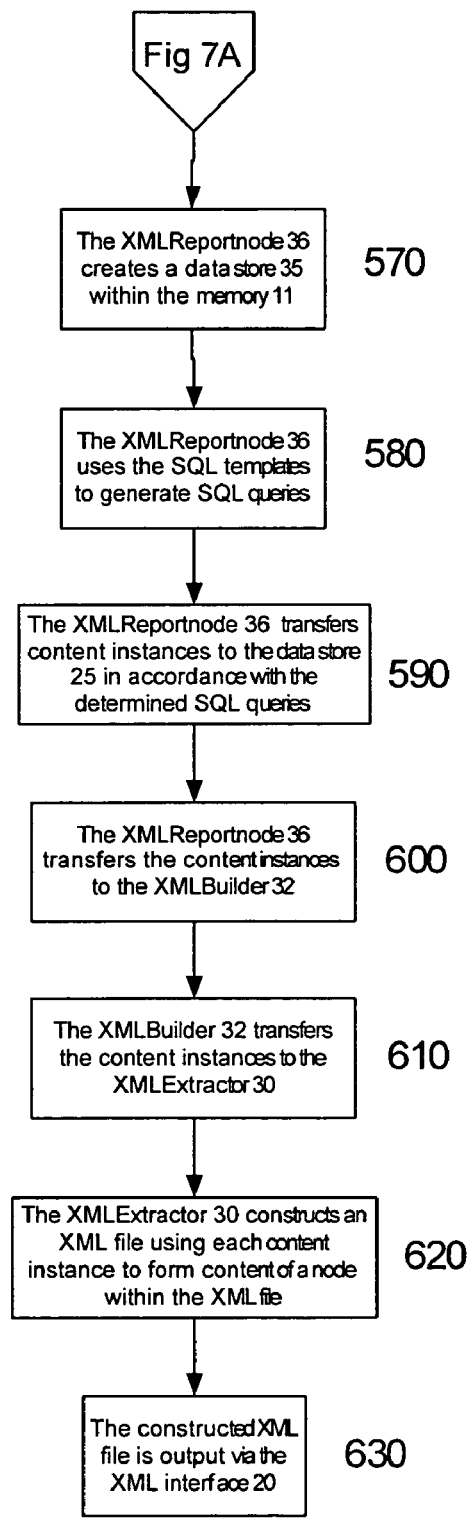

In any event, the manner in which the system operates to generate an XML file will now be described with more detail with reference to FIGS. 7A, 7B.

Firstly, as shown at step 500, the XMLExtractor 30 receives instructions to create an XML file. This may be achieved in a number of ways depending on the circumstances. Thus, for example, a user of the processing system 1 may provide input commands via the I/O device 14, requesting that an XML file containing certain content is produced.

Alternatively however the processing system 1 may be adapted to generate XML files containing predetermined content on a predetermined basis. This may be required for example when generating reports, or to ensure content is correct within the database. In this case, the instructions to proceed with the creation of an XML file may be stored in the memory 11 before being implemented at a predetermined time. This may be achieved for example by storing a schedule in the memory 11 indicating when predetermined XML files are to be created.

In any event, the XMLExtractor 30 transfers an indication of the XML file to be created to the XMLBuilderFactory 31 at step 510. At step 520 the XMLBuilderFactory 31 obtains a report indication from the Adapter Configuration 34. The report indication will typically be pre-specified to allow particular content to be extracted from the database 2, thereby allowing the specified XML file to be produced.

It will be appreciated by those skilled in the art, that the reports will typically need to be pre-defined. In particular, the reports will need to include SQL query templates including an indication of the content instances that are to be extracted from the database 2. This will therefore need to include details of the relevant database fields within which the respective content instances are stored.

Thus, the indication of the XML file to be created, which is received by the XMLBuilderFactory 31 will include an indication of the content to be included in the file. This may be an indication of specific content, in which case, the XMLBuilderFactory 31 will select an appropriate report. Alternatively, the indication of the XML file to be created may include reference to a predetermined report stored in the Adapter Configuration. Thus, the indication may specify a predetermined report.

In any event, the XMLBuilderFactory 31 uses the indication of the XML file to be created to identify the desired report stored in the Adapter Configuration 34. At step 530 the XMLBuilderFactory 31 transfers an indication of the identified report to the XMLExtractor 30, which then transfers the report indication to the XMLBuilder 32 at step 540.

At step 550 the XMLBuilder 32 obtains the report, including the SQL templates, from the Adapter Configuration 34. The XMLBuilder 32 transfers the report and the SQL templates to the XMLReportNode 36 at step 560.

At step 570 the XMLReportNode 36 creates a data store 35 within the memory 11. Again, the data store 35 includes fields corresponding to each of the fields in the database 2 from which content is to be extracted.

At step 580 the XMLReportNode 36 uses the SQL templates to generate SQL queries. The SQL queries are used to query the database 2, causing the required content instances to be transferred to the data store 35 at step 590.

During this procedure, each content instance will be transferred into a respective field within the data store 35, with the data store field being selected in accordance with the database field from which the content instance has been extracted.

As in the case of storing content in the database 2, there may also be some combining or separation of the content instances from different database fields to form a single content instance for storage in a single data store field, as will be appreciated by those skilled in the art.

At step 600 the XMLReportNode 36 transfers the content instances to the XMLBuilder 32, which then operates to transfer the content instances to the XMLExtractor 30 at step 610. Finally, at step 620 the XMLExtractor 30 constructs the XML file for output via the XML interface 20.

At this point each content instance will be used to form the content of a respective node within the XML file, with the node type being determined on the basis of the field within which the data is stored in the database 2. Accordingly, it will be appreciated that in order to achieve this, it is necessary to use a mapping specifying to which node type the content of each database field should be mapped. The mapping will again be determined in accordance with the respective document type definition, and stored in the Adapter Configuration 34.

In this case the XMLExtractor 30 will be provided with details of the mapping to be used by the XMLBuilder 32, although any suitable method of transferring the mapping to the XMLExtractor may be used.

Accordingly, the above described methodologies provide a simple technique for automatically storing the content of XML files in a database and/or retrieving content from the database to generate an XML file.

In particular, the use of the intermediate data store 25, 35 is particularly beneficial as it ensures that the content is correctly organized within respective fields and nodes within the database 2 and the created XML file.

The use of the data store also allows for manipulation of the content during the transfer between the database 2 and the XML file, for example by combining content instances as described above. This allows variations in the formatting of the database fields and the XML file nodes to be accounted for automatically as the data is transferred, simply by defining an appropriate mapping.

In addition to this, the use of the data store and appropriate mappings helps ensure that the hierarchy of the data within the XML file is retained in the relational database 2. This is particularly beneficial, as it is normally complicated to attempt to re-create the XML file hierarchy within relational databases. In particular, it is often necessary to have an operative review the XML file in detail and consider the hierarchy structure, then ensure that this hierarchy structure can be reflected in the relational database metadata. In contrast to this, the hierarchy structure is automatically reflected within the relational database by virtue of the methodology described above, and in particular by virtue of the use of the intermediate data store and appropriate mapping.

In particular, content instances may be extracted from the XML file in accordance with their hierarchy. Similarly, content instances may be extracted from the database 2 in such a manner that they logically form the hierarchy when inserted into the XML file. This is possible because it is not typical for all the content instances to be transferred at any one time.

Thus, in the case of extracting content instances from an XML file, the content instance of a given node in the hierarchy level, together with all the respective child node content instances, will typically be transferred to the data store 25 at step 390. The content instances are then stored in the database 12 at step 400. Once this has been completed, the XMLInserter 21 then proceeds to handle the content instances of other nodes, and their associated child nodes.

Thus, the content may be processed hierarchically so that the hierarchical structure of the content may be reflected in the manner in which the data is transferred into the database.

This will now be described in more detail.

Figure 8A:
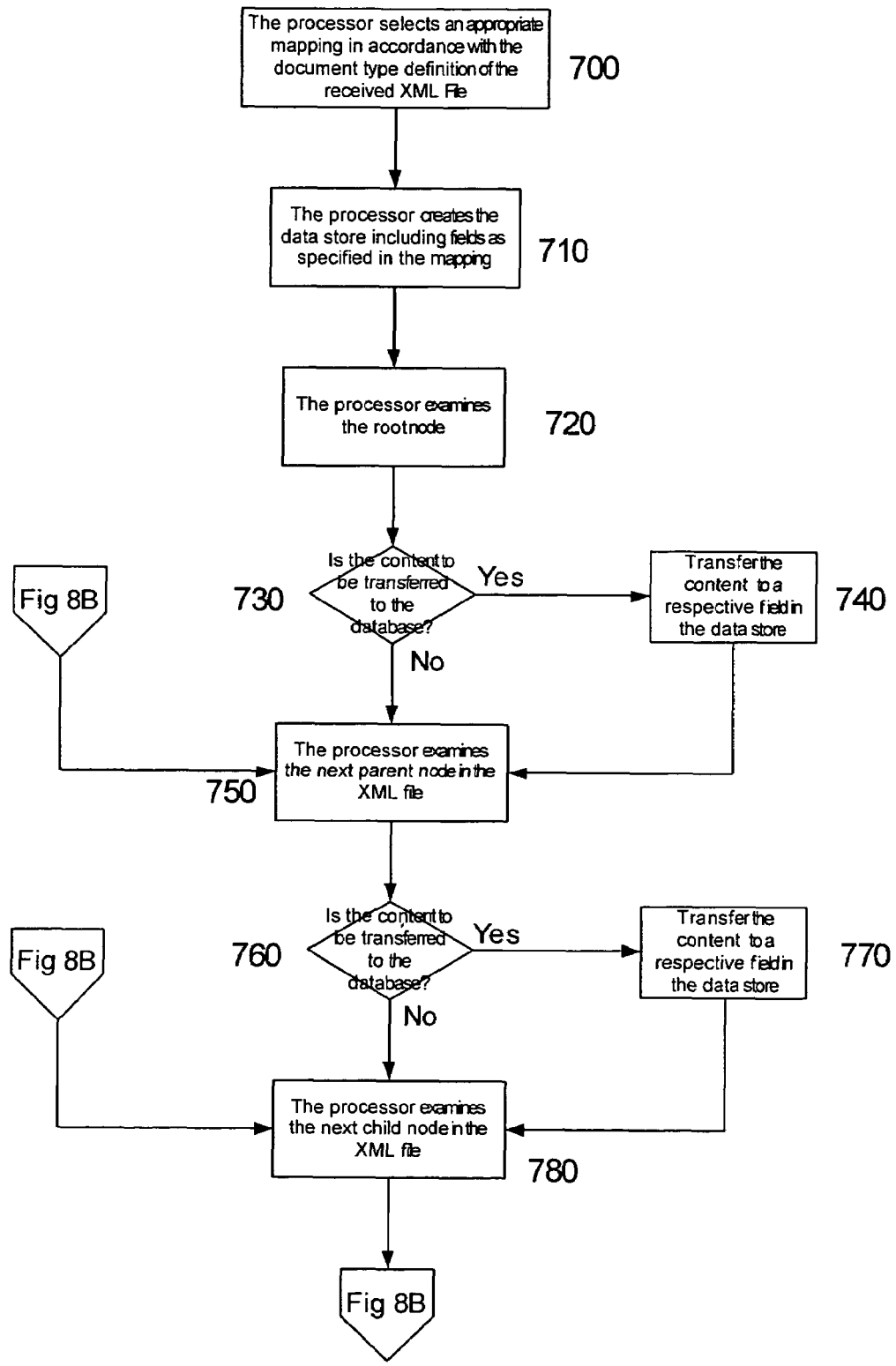
FIGS. 8A and 8B are a flow chart of the operation of the mapping when storing content from a file into the database.
Figure 8B:
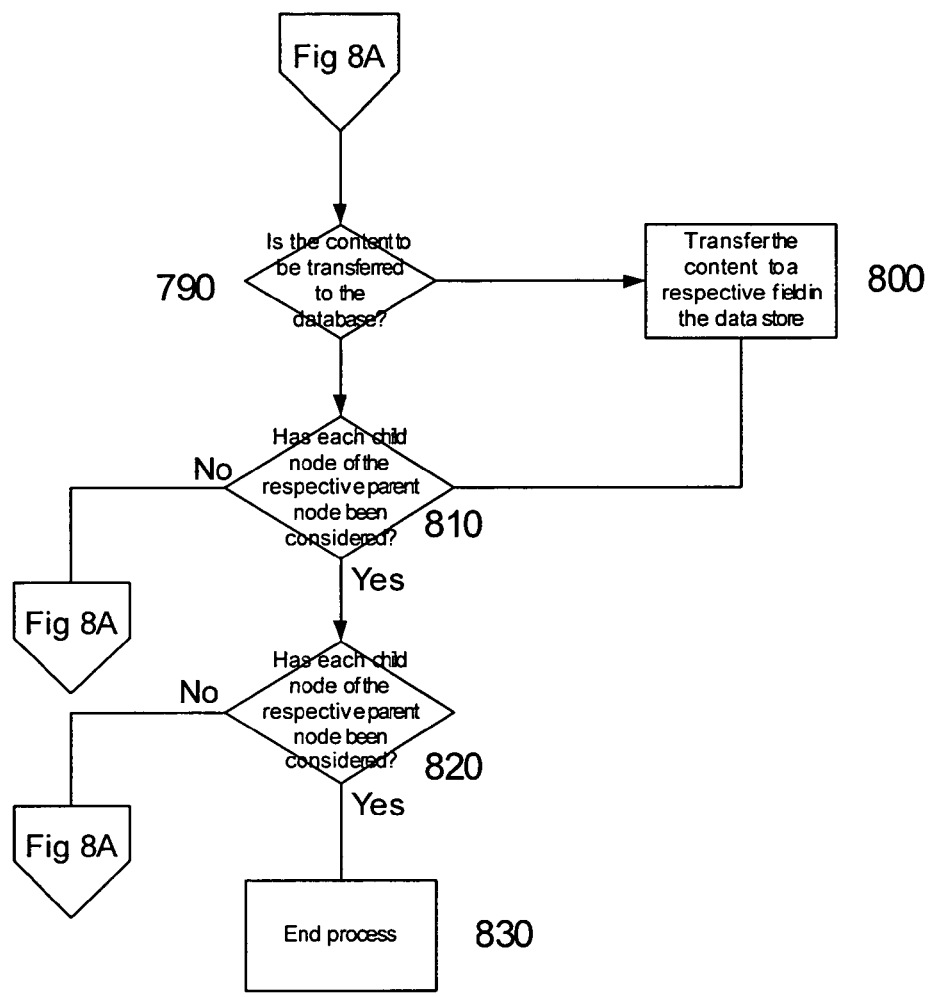

Thus, for example, as shown in FIGS. 8A, 8B, the processor 10 will initially determine the required mapping (node map) in accordance with the document type definition of the XML file at step 700. Once this has been completed, the processor 10 will create the data store 25, including fields as specified in the mapping at step 710. In this case, the mapping will specify a respective field corresponding to each node type within the XML file, and accordingly, the processor can examine the number of each type of node in the XML file and create an appropriate number of fields in the data store.

Following this, the processor will examine the root node of the XML file at step 720 and determine if the content contained therein is to be transferred to the database in accordance with instructions defined in the mapping. If the content is to be transferred to the database at step 730, then the processor copies the content to the respective field in the data store at step 740.

If no content is to be copied, or once this has been completed, the processor 10 will move onto consider the next parent node at step 750. Again, if it determined that content is to be transferred at step 760, then the content is copied into the respective field within the data store 25 at step 770.

Otherwise, the process moves on to consider the next child node for the respective parent node at step 780. Again, if it determined that content is to be transferred at step 790, then the content is copied into the respective field within the data store 25 at step 800.

In any event, the processor then determines at step 810 if each child node of the respective parent node has been processed. If not, the processor returns to step 780 to process the next child node. Otherwise, the processor proceeds to step 820 to determine if all the parent nodes have been considered. In this case, if not all the parent nodes have been considered, the processor moves on to step 750 to repeat the process with the next parent node.

Accordingly, all the children nodes associated with a given parent node are processed before the next parent node is processed. Once all the parent nodes are processed, this procedure ends at step 830.

In any event, during this process the content may also be transferred to the database 2. In general the transfer of data from the data store 25 will be achieved by simply transferring the content of a specified field type into a specific type of field within the database, as described above. This process is typically performed on a first-in-first-out (FIFO) basis, such that the content transferred to the data store first, is the first content to be transferred to the database. Furthermore, the mapping may be arranged such that the content instances for each parent (and the associated children nodes) are transferred into the database before the next parent node is processed. Alternatively, all the nodes may be processed before the content instances are transferred to the database.

The process is similar when data is extracted from the database 2, such that the content for a respective level in the XML file hierarchy may be extracted simultaneously, with the XMLReportNode 36 transferring the content instances to the data store 35 at step 590. Once completed for a first set of nodes in the hierarchy, the XMLBuilder can move on to obtain content for insertion in the nodes of the next level, such as the children nodes.

As a result of this, the XMLExtractor 30 receives content corresponding to each level in the hierarchy separately, thereby allowing the hierarchical structure of the XML file to be constructed as required.

However, in this case, it will be appreciated that the processor will not initially know how many fields will be required in the store until reports have been executed to determine the number of content instances to be transferred.

Figure 9A:
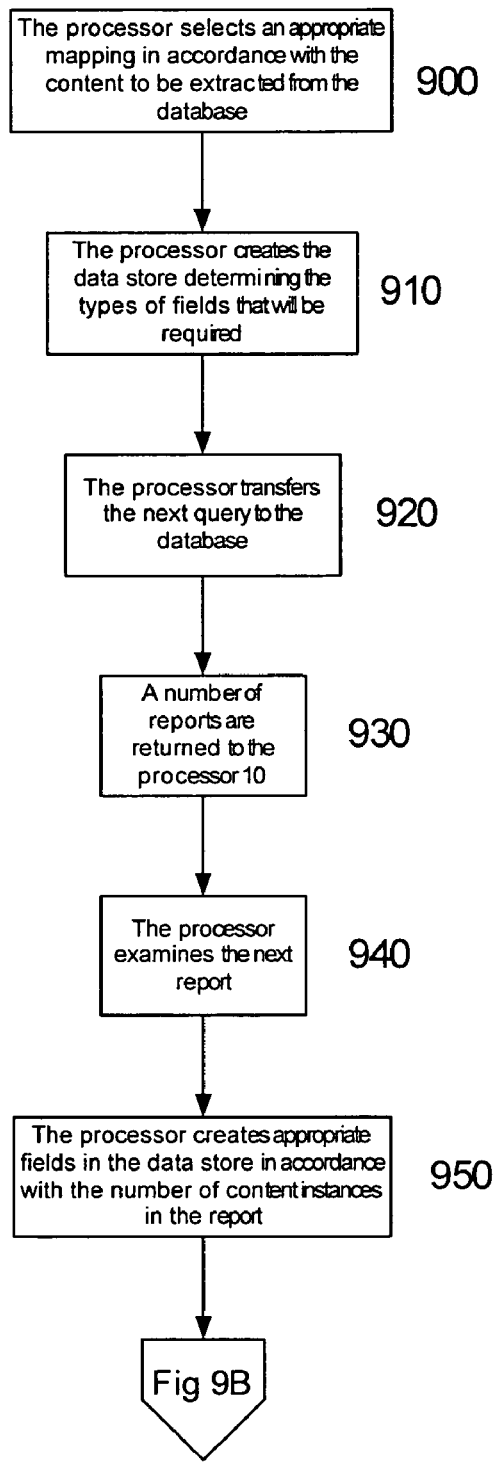
FIGS. 9A and 9B are a flow chart of the operation of the mapping when storing content from the database into a file; and, FIG. 10 is a schematic diagram of a second example of a system for implementing the present invention.
Figure 9B:
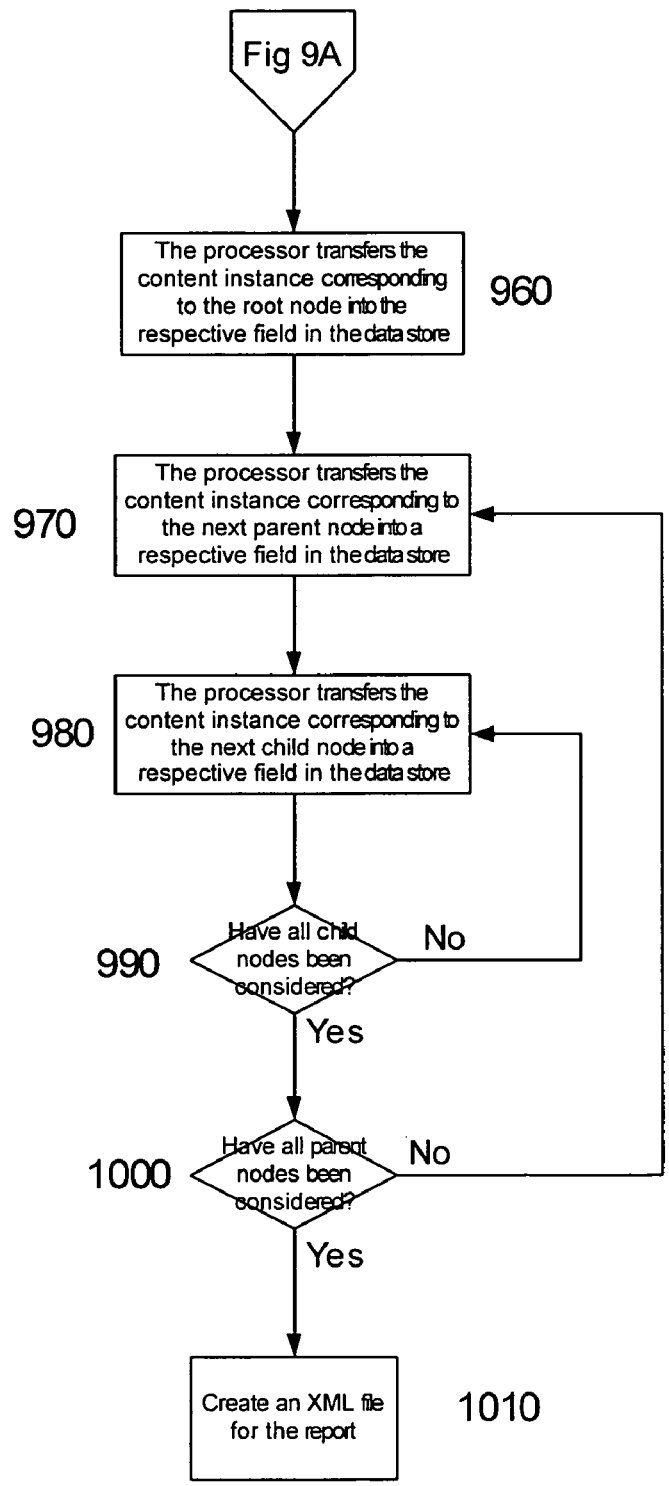

Accordingly, the process is as outlined in FIGS. 9A and 9B. In this case, once the processor 10 will initially determine the required mapping in accordance with the content to be extracted from the database.

The mapping will include one or more SQL Queries, which when executed will each extract respective content from the database. Each query will cause the generation of a number of reports, depending on the database content. Furthermore, each generated report will correspond to a respective root node, and will therefore correspond to a respective final XML file. Accordingly, any given mapping definition may result in the generation of a number of output XML files.

In order to handle this, the processor can merely determine the field types that need to be included in the data store at step 910, but not the number of fields. Accordingly, at step 920, the processor transfers the next query to the database, to thereby cause a number of reports to be generated. The reports are returned to the processor at step 930, allowing the processor to examine the number of content instances returned by the report. This allows the processor to determine an appropriate number of fields of each type to include in the data store, at steps 940, 950.

At step 960, the processor 10 then transfers the content instance that will correspond to the root node to the data store. This is performed in accordance with instructions in the mapping, such that the mapping defines the content instance that will form the root node.

At step 970, the processor 10 transfers the content instance that will correspond to the next parent node to the data store, before transferring the content instance of the next child node at step 980. At step 990, the processor determines if all the content instance corresponding to the child nodes have been determined, and if not returns to step 980 until every child node corresponding to the first parent node have been completed. Steps 970 to 990 are then repeated for the remaining parent nodes, until all content instances have been transferred to the data store.

The process can then end at step 1010, when the XML file is created.

Again, the content instances are preferably transferred from the data store to the file in a FIFO fashion. In this case, the XML hierarchy will therefore be constructed automatically by virtue of the pre-defined mapping rules.

Once the first report is completed, the processor can return to step 940 to consider the next report.

In any event, it will be appreciated from this that the use of the mappings allow the structure of the XML file to be created automatically as the content is extracted from the database.

Alternative Architectures

In the example described above, the system is implemented using a single processing system 1 coupled to database 2, however, the system can be implemented using a wide variety of architectures which provide a wide range of functionality's using the methodologies described above.

Examples of this will now be described with reference to FIG. 10, which is an example of a system incorporating a number of processing systems 1 and databases 2. In particular, the system includes two local area networks (LANs) 4A, 4B coupled together via a communications network 3, such as the Internet, or the like.

Figure 10:
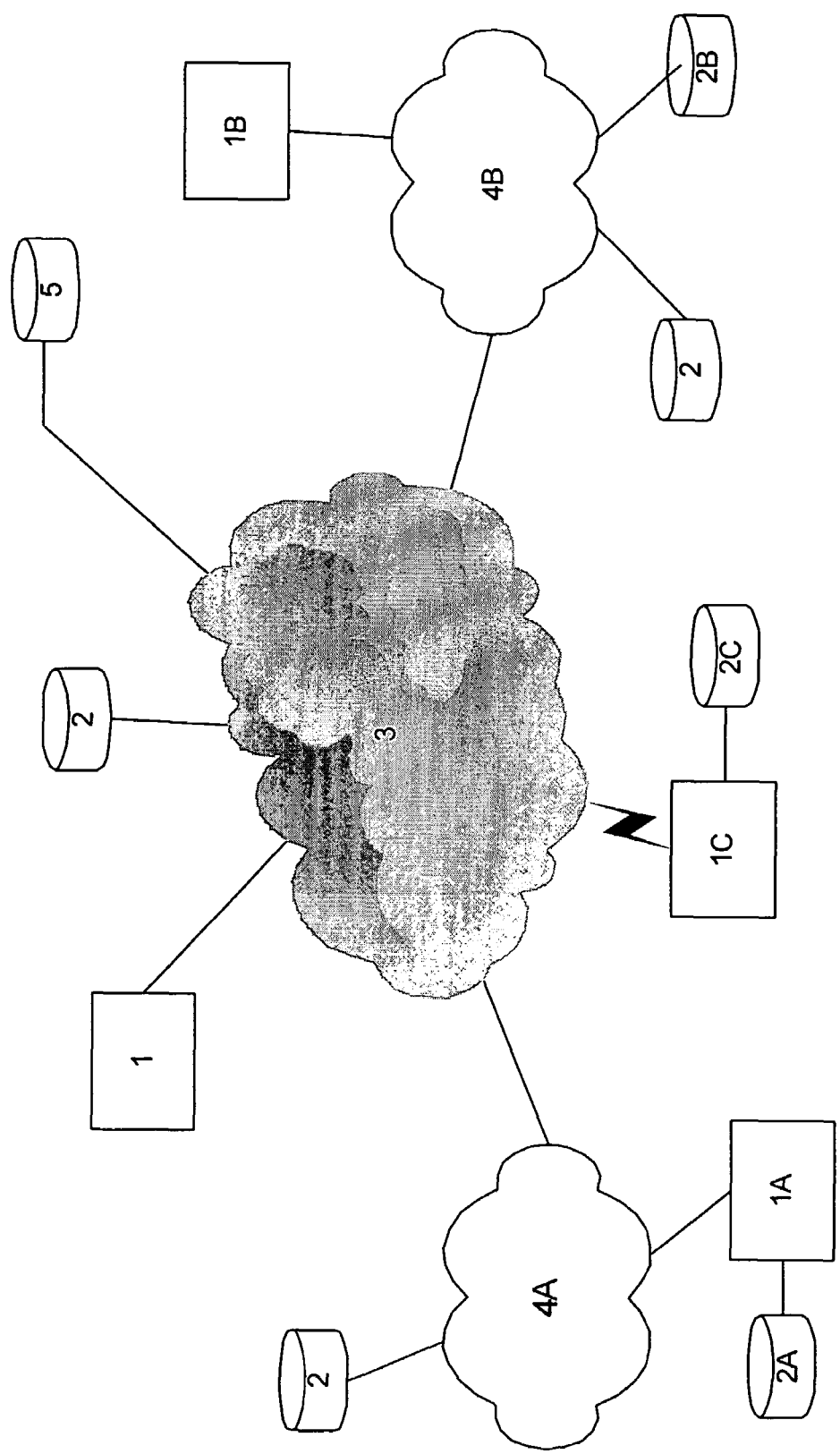

As shown in FIG. 10, a number of processing systems 1 are provided coupled to respective ones of the local area networks 4A, 4B and the Internet 3. A number of databases 2 are also provided. Finally, a resource database shown generally at 5 is also provided coupled to the Internet as shown.

In a first example the processing system 1A is directly coupled to a database 2A, allowing content to be transferred between the database 2A and an XML file in the manner described above. However, in addition to this, the processing system 1A can also be adapted to store or retrieve content from any one of the other databases 2 which are coupled to the LANs 4A, 4B, or the Internet 3.

In particular, when the processing system 1A receives an XML file, the content of the XML file is temporarily stored in the data store 25 before being transferred on to a database 2. By suitable configuration, the processing system 1A can be adapted to transfer the content directly from the data store 25 to either database 2A, and/or any one of the databases 2.

From this, it will be realized that the processing system 1A can be adapted to ensure that a number of databases are updated simultaneously, even if the databases are provided at separate geographical locations. This situation is particularly useful for example when a company maintains a number of different databases at distributed locations. In this instance, identical databases may be provided at different geographical locations for redundancy purposes. However, it can be important to ensure that the contents of each database are updated when any one of the other databases are updated. Accordingly, in this instance the processing system 1A can be adapted to update each database simultaneously. Furthermore, as this only requires that content instances are copied from the data store 25 to a number of databases 2, there is little additional processing required.

Similarly, when an XML file is being created, the processing system 1A can be adapted to query any one or more of the databases 2 to obtain the content instances. Thus, this allows information to be collected from a number of geographically separate locations and incorporated into a single XML file centrally.

It will be appreciated that in order for this to be possible, the processing system 1A may require access permission to access content contained within any one of the databases 2.

A second example of the manner in which the methodology may be used is to allow content to be transferred between two databases 2A, 2B.

In this example, if it is desired to transfer information from the database 2A to the database 2B, there can sometimes be problems occurring for example if the database 2A, 2B have different relational structures, or include information stored in different formats or the like. In this instance, in order to overcome the problem the processing system 1A can be used to generate an XML file containing any information to be transferred to the database 2B, in the manner described above.

When the XML file is created, this is achieved by extracting content from the database 2A in the normal way to form an XML file having a predetermined standard. The XML file can then be transferred via the LAN 4A, the Internet 3 and the LAN 4B to the processing system 1B. The processing system 1B can then extract the content from the XML file using the received document type definition, and an appropriate mapping, thereby allowing the content to be transferred into the database 2B in accordance with the manner described above.

By converting the content into an intermediate XML file, this allows date to be transferred between two databases, even if the databases store content in different fields and have a different overall structure.

It will be appreciated that in order for this to be achieved successfully it will be necessary for each processing system 1A, 1B to be provided with respective mappings in each Adapter Configuration 24, 34.

In order to aid this, the centralized database shown generally at 5, may be provided to include details of document type definitions and associated mappings. The centralized database 5 can then be used as a reference resource by each of the processing systems 1, 1A, 1B, 1C as required.

Thus, for example, if the processing system 1A obtains an XML file having a previously document type definition previously unencountered by the processing system 1A, then the processing system 1A can access the database 5 to determine if the document type definition is contained therein. Once the document type definition has been located, the processing system 1 can proceed to determine if an appropriate mapping has already been determined to map the nodes of the document type definition into a respective fields within the database. This would occur for example if standard database structures are used in more then one location, such that a mapping is already defined for example for the database 2B, which has an identical field structure to the database 2A.

FIRST SPECIFIC EXAMPLE

Inserting Content

A specific example of the insertion of the content of an XML file into the database will now be described with reference to FIG. 4.

In this example, each of the different functional elements in the processing system is capable of executing respective commands to achieve the desired operation. In particular, the functions used are as set out in table 1.

TABLE 1

| Functional Element | Command |
|---|---|
| XmlInserter 21 | InsertDoc(doc) |
| NodeMapFactory 22 | getNodeMap(docId) |
| NodeMap element 23 | getRules(nodeId) |
| | createDataStore( ) |
| Data Store 25 | getValue(valueId) |
| | setValue(valueId, value) |
| | populateStatement (stmt) |
| NodeRules element 27 | startInsert |
| | endInsert |
| | startClear |
| | endClear |
| | defaultValue |
| | valueId |
| | valueField |

In this case, the Message Interface 20 operates to locate an XML document from a set of known document types to be inserted. The Message Interface 20 uses "insertDoc(doc)" on the XmlInserter 21 to insert the XML document. In order to achieve this the XmlInserter 21 uses "getNodeMap(docId)" on the NodeMapFactory 22 to look up the NodeMap 23 for this document. The NodeMapFactory 22 uses the Adapter Configuration 24 to determine each Document's NodeMap. The XmlInserter 21 uses "createDataStore( )" on the NodeMap 23 to prepare a new DataStore 25 for this XML document. The XmlInserter 21 locates the XML document's Document Node and processes the Node, keeping a register of SQL statements to be executed. The XmlInserter executes all registered SQL statements on the Database 2.

For each Node the XmlInserter 21 uses "getRules(nodeId)" on the current NodeMap 23 to look up this Node's NodeRules 27. This set of NodeRules defines default conditions, SQL templates for execution at the start and end of the Node, and a DataStore valueId for the storage of this Node's data. The XmlInserter 21 adds the "Start of Node" SQL statement (if any) to its register of SQL statements. The XmlInserter 21 stores this Node's data into the DataStore value specified by the valueId. The XmlInserter looks up each child Node of this Node and recursively processes each child node. The XmlInserter 21 adds the "End of Node" SQL statement (if any) to its register of SQL statements. The XmlInserter 21 uses "populateStatement(stmt)" on the DataStore 25 to populate the already registered "Start of Node" and "End of Node" statements.

An example of the XML document to be inserted is shown below:

```
Document Type Definition:
    <?xml encoding="US-ASCII"?>
    <!ELEMENT Account (Update)>
    <!ELEMENT Update (Name, Total)>
    <!ATTLIST Update
        UserId CDATA #REQUIRED>
    <!ELEMENT Name (#PCDATA)>
    <!ELEMENT Total (#PCDATA)>
Example XML document
    <?xml version="1.0" encoding="UTF-8"?>
    <!DOCTYPE Account SYSTEM
    "http://ourserver/accountupdate.dtd">
    <Account>
        <Update UserId="5">
            <Name>John Doe</Name>
            <Total>15.26</Total>
        </Update>
    </Account>
```

The structure of the database 2, includes USER and ACCOUNT tables, as shown in tables 2 and 3 below.

| Table 2 | | | Table 3 | |
|---|---|---|---|---|
| Field Name | Field Type | | Field Name | Field Type |
| USERID | Integer | ← | USERID | Integer |
| NAME | Varchar | | TOTAL | Decimal |

A simple Intermediate Data-Store that allows the update of the above database from the XML document might be as shown in table 4.

TABLE 4

| Value Id | Value Type |
|---|---|
| UserId | String |
| Name | String |
| Total | String |

The following XML element contains sufficient information to configure an adaptor capable of performing the required mapping:

```
1.      <?xml version="1.0"?>
2.
3.          <NodeMap MapId="http://ourserver/accountupdate.dtd">
4.          <NodeRules NodeId="Account.Update">
5.              <EndInsert>update accounts set name='_$Name$_' where userid=_$UserId$_</EndInsert>
6.          </NodeRules>
7.
8.          <NodeRules NodeId="Account.Update.UserId">
9.              <ValueId>UserId</ValueId>
10.         </NodeRules>
11.
12.     <NodeRules NodeId="Account.Update.Name">
13.         <ValueId>Name</ValueId>
14.     </NodeRules>
15.
16.     <NodeRules NodeId="Account.Update.Total">
17.         <ValueId>Total</ValueId>
18.         <EndInsert>update accounts set total=_$Total$_ where userid=_$UserId$_</EndInsert>
19.     </NodeRules>
20.
21.     <Value ValueId="UserId" Type="String"/>
22.     <Value ValueId="Name" Type="String"/>
23.     <Value ValueId="Total" Type="String"/>
24. </NodeMap>
```

The NodeMap element for MapId "http://ourserver/accountupdate.dtd" (line 3) declares that this configuration is to used for XML documents of the defined type.

The NodeRules Element with NodeId="Account.Update" (lines 4 to 6) declares the following:

These rules apply to the XML Node "Update" which is a child node of the XML Node "Account";

At the end of this element the SQL Template "update accounts set name='_$Name$_' where userid=_$UserId$_" is to be used The String _$Name$_ is replaced with the content of the Data-Store value "Name".

The String _$UserId$_ is replaced with the content of the Data-Store value "UserId".

The NodeRules Element with NodeId="Account.Update.UserId" (lines 8 to 10) declares the following:

These rules apply to the XML Node "UserId" which is a child node of "Update" which is a child node of the XML Node "Account";

The data content of this node is to be stored in the Data-Store value "UserId".

The NodeRules Element with NodeId="Account.Update.Name" (lines 12 to 14) declares the following:

These rules apply to the XML Node "Name" which is a child node of "Update" which is a child node of the XML Node "Account";

The data content of this node is to be stored in the Data-Store value "Name".

The NodeRules Element with NodeId="Account.Update.Total" (lines 12 to 14) declares the following:

These rules apply to the XML Node "Total" which is a child node of "Update" which is a child node of the XML Node "Account";

The data content of this node is to be stored in the Data-Store value "Total";

At the end of this element the SQL Template "update accounts set total=_$Total$_ where userid=_$UserId$_" is to be used.

The String _$Total$_ is replaced with the content of the Data-Store value "Total".

The String _$UserId$_ is replaced with the content of the Data-Store value "UserId".

The Value elements (lines 21 to 23) declare the appropriate values in the Data-Store.

SECOND SPECIFIC EXAMPLE

Extracting Content

A specific example of the creation of an XML file from database content will now be described with reference to FIG. 6.

In this example, each of the different functional elements in the processing system is capable of executing respective commands to achieve the desired operation. In particular, the functions used are as set out in table 5.

TABLE 5

| Functional Element | Command |
|---|---|
| XmlBuilderFactory 31 | getReportBuilder(reportId) |
| XMLBuilder 32 | getReport( ) |
| Data Store 35 | getValue(valueId) |
|  | setValue(valueId, value) |
|  | populateStatement (stmt) |
| XMLReportNode 36 | XMLName |
|  | XMLType |
|  | Statement |
|  | Children |
|  | appendNode(doc) |
|  | appendNode(element) |

In this case, the XmlExtracter 30 identifies that it needs to generate an XML document. It calls "getReportBuilder(reportId)" on XmlBuilderFactory 31 to create an XmlBuilder 32 configured to generate the correct XmlDocument. The XmlBuilderFactory 31 determines the XmlBuilder configuration details from the Adapter Configuration 34. The XmlExtracter 30 calls "getReport( )" on the XmlBuilder 32 to generate the XML Document. The XmlBuilder 32 determines the Database 2, DataStore 35 and XML Document details from the Adapter Configuration 34. The XmlBuilder 32 determines the XML Document's XmlReportNode 36 from the Adapter Configuration. The XmlReportNode 36 contains links to child XmlReportNodes which represent XML structure. The XmlBuilder 32 creates the XML Document, and uses appendNode(doc)" on the XML Document's XmlReportNode 36 to append the XML Document's document Node.

Each XmlReportNode 36 contains:
The name of the Xml Node to be generated.
The type of Xml Node to be generated (Element or Attribute)
The SQL Template to be used for retrieving data.
The valueIds for storing retrieved data in the DataStore
And XmlReportNode 36 links to child XmlReportNode In this example the same XML Structure and database structure shown in tables 2 and 3 is used. In this case the XML document will be extracted from the database.

An Intermediate Data-Store that allows the extraction of the XML document from the given database might have the values shown in table 6.

TABLE 6

| Value Id | Value Type |
|---|---|
| UserId | String |
| Name | String |
| Total | String |

The following XML fragment contains sufficient information to configure an adaptor capable of performing the required mapping:

```
1.      <Report>
2.              <DocumentNode Name="Account"/>
3.              <DocumentId Type="http://ourserver/accountupdate.dtd"/>
4.              <ReportNode Name="Account">
5.                  <Element Name="Account" >
6.                      <Query>Select Name from user where userid=__$UserId$__</Query>
7.                      <Result ValueId="Name"/>
8.                      <ChildNode Name="Account.Update"/>
9.                  </Element>
10.     </ReportNode>
11.     <ReportNode Name="Account.Update">
12.         <Element Name="Update" >
13.             <Query>Select total from account where userid=__$UserId$__</Query>
14.             <Result ValueId="Total"/>
15.             <ChildNode Name="Account.Update.UserId"/>
16.             <ChildNode Name="Account.Update.Name"/>
17.             <ChildNode Name="Account.Update.Total"/>
18.         </Element>
19.     </ReportNode>
20.     <ReportNode Name="Account.Update.UserId">
21.         <Attribute Name="UserId" ValueId="UserId"/>
22.     </ReportNode>
23.     <ReportNode Name="Account.Update.Name">
24.         <Element Name="Name" ValueId="Name"/>
25.     </ReportNode>
26.     <ReportNode Name="Account.Update.Total">
27.         <Element Name="Total" ValueId="Total"/>
28.     </ReportNode>
29.     <Value ValueId="UserId" Type="String"/>
30.     <Value ValueId="Name" Type="String"/>
31.     <Value ValueId="Total" Type="String"/>
32. </Report>
```

The Report element (line 1) indicates that this configuration fragment is to generate a Report.

The DocumentNode element (line 2) declares that the adaptor adds the XML element defined by the ReportNode with Name="Account" to the XML Document.

The DocumentId element (line 3) declares that the Document Type Definition for this Document is "http://ourserver/accountupdate.dtd"

The ReportNode element with Name="Account" (line 4-10) is referred to by the DocumentNode element and declares the following:

- This ReportNode represents an XML element with the name "Account;
- The element contains a Query element with the data "Select Name from user where userid=_$UserId$_"
  - The String _$UserId$_ is replaced with the contents of the Data-Store value UserId.
  - The pre-populated value UserId determines report content;
- The first result column of the above query is placed in the Data-Store value "Name";
- A Child node (either an element or an attribute) is defined in a ReportNode with the Name Account.Update. The Child node is added to this element.

The ReportNode element with Name="Account.Update" (line 11-19) declares the following:

- This ReportNode represents an XML element with the name "Update";
- The element contains a Query element with the data "Select total from account where userid=_$UserId$_"
  - The String _$UserId$_ is replaced with the contents of the Data-Store value UserId.
  - The pre-populated value UserId determines the report content;
- The first result column of the above query is placed in the Data-Store value "Total";
- A Child node (either an element or an attribute) is defined in a ReportNode with the Name Account.Update.UserId The Child node is added to this element;
- A Child node (either an element or an attribute) is defined in a ReportNode with the Name Account.Update.Name The Child node is added to this element;
- A Child node (either an element or an attribute) is defined in a ReportNode with the Name Account.Update.Total The Child node is added to this element.

The ReportNode element with Name="Account.Update.UserId" (line 20-22) declares the following:

- This ReportNode represents an XML attribute with the name "UserId". The Attribute Value is obtained from the Data-Store value "UserId".

The ReportNode element with Name="Account.Update.Name" (line 23-25) declares the following:

- This ReportNode represents an XML attribute with the name "Name". The Attribute Value is obtained from the Data-Store value "Name".

The ReportNode element with Name="Account.Update.Total" (line 26-28) declares the following:

- This ReportNode represents an XML element with the name "Name". The Attribute Value is obtained from the Data-Store value "Name".

The three Value elements (line 33 to 35) declare three Data-Store values with Ids UserId, Name and Total, all of type String.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method of transferring content from a database to a file, the database including content instances, each content instance being associated with a respective database field, and each database field having a respective type, the method including:
   a) retrieving each content instance from the database by performing at least one query, the query being adapted to extract content instances from the database as a number of reports, wherein for each respective report:
   i) determining the number of content instances in the report;
   ii) generating a respective store field for each content instance in the report, the store field type being determined in accordance with the database field type; and,
   iii) determining a parent content instance;
   iv) transferring the parent content instance to a respective store field;
   v) determining any child content instances; and,
   vi) transferring the child content instances to respective store fields; and,
   vii) repeating steps (i) to (vi) for each report;
   b) generating store fields in a data store wherein each store field has a respective store field type in accordance with the respective report;
   c) storing in the data store each content instance from each respective report in a respective store field in accordance with the database field type of the associated database field;
   d) creating a file including a number of fields, each field having a type in accordance with the respective report; and,
   e) transferring from the data store each content instance into a respective field within the file, in accordance with the store field type.

2. A method according to claim 1, the file being an XML file, each content instance being a respective node in the XML file.

3. A method according to claim 2, the method including generating the field type of each field using a document definition file.

4. A method according to claim 1, the database being a relational database, the method including transferring each content instance to the store using a respective query, the query determining the database field type.

5. A method according to claim 4, the query being an SQL query.

6. A method according to claim 4, the method including:
   a) creating the query including one or more vacant locations;
   b) applying the query to the database to thereby transfer each content instance into a respective vacant location; and,
   c) transferring the content instance to the store.

7. A method according to claim 6, the method including:
   a) determining a mapping between each database field type of the associated database field and each field type;
   b) creating store fields corresponding to each content instance, each store field being determined in accordance with the field type of the associated database field and the mapping; and, c) transferring each content instance into a respective store field.

8. A method according to claim 7, the method including:
a) generating fields in the file in accordance with the database field type of each associated database field and the mapping; and,
b) transferring each content instance from the store field to the respective field.

9. A method according to claim 7, the method including determining the mapping from a predetermined mapping stored in a store.

10. A method according to claim 1, the method including using a processing system, the processing system having a processor coupled to a store, the processor being adapted to:
a) retrieve each content instance from the database:
b) store each content instance in the store; and,
c) generate the file.

11. A processing system adapted to transfer content from a database to a file, the database including content instances, each content instance being associated with a respective database field, and each database field having a respective type, the processing system including a processor for:
a) retrieve each content instance from the database by performing at least one query, the query being adapted to extract content instances from the database as a number of reports; wherein for each respective report:
  i) determining the number of content instances in the report;
  ii) generating a respective store field for each content instance in the report, the store field type being determined in accordance with the database field type; and,
  iii) determining a parent content instance;
  iv) transferring the parent content instance to a respective store field;
  v) determining any child content instances; and,
  vi) transferring the child content instances to respective store fields; and,
  vii) repeating steps (i) to (vi) for each report;
b) generating store fields in a data store wherein each store field has a respective store field type in accordance with the respective report;
c) storing in the data store each content instance from each respective report in a respective store field in accordance with the database field type of the associated database field;
d) creating a file including a number of fields, each field having a type in accordance with the respective report; and,
e) transferring from the data store each content instance into a respective field within the file, in accordance with the store field type.

* * * * *